United States Patent
Tudose

(10) Patent No.: US 9,912,386 B2
(45) Date of Patent: Mar. 6, 2018

(54) METHOD FOR OPERATING OBJECT CAPABLE VIA CONTACTLESS COMMUNICATION

(71) Applicant: STMicroelectronics International N.V., Amsterdam (NL)

(72) Inventor: Andrei Tudose, Chateauneuf (FR)

(73) Assignee: STMicroelectronics International N.V., Amsterdam (NL)

( * ) Notice: Subject to any disclaimer, the term of this patent is extended or adjusted under 35 U.S.C. 154(b) by 199 days.

(21) Appl. No.: 14/853,667

(22) Filed: Sep. 14, 2015

(65) Prior Publication Data

US 2016/0119033 A1    Apr. 28, 2016

(30) Foreign Application Priority Data

Oct. 24, 2014    (FR) ...................................... 14 60249

(51) Int. Cl.
*H04Q 5/22* (2006.01)
*H04B 5/00* (2006.01)
*G06K 7/10* (2006.01)

(52) U.S. Cl.
CPC ....... *H04B 5/0075* (2013.01); *G06K 7/10009* (2013.01); *H04B 5/0031* (2013.01); *H04B 5/0056* (2013.01)

(58) Field of Classification Search
CPC ............................ H04B 5/0075; G06K 7/10009
See application file for complete search history.

(56) References Cited

U.S. PATENT DOCUMENTS

| | | | |
|---|---|---|---|
| 6,975,245 B1* | 12/2005 | Slater | A01G 25/167 239/63 |
| 2006/0132289 A1* | 6/2006 | Conraux | G01S 13/75 340/10.34 |
| 2006/0145851 A1* | 7/2006 | Posamentier | G06K 7/0008 340/572.1 |
| 2007/0139198 A1* | 6/2007 | Shim | G06K 19/0701 340/572.1 |
| 2007/0290846 A1 | 12/2007 | Schilling et al. | |
| 2008/0238630 A1* | 10/2008 | Chen | G06K 19/0701 340/10.5 |
| 2009/0308937 A1* | 12/2009 | Yagi | G06K 19/0707 235/492 |

FOREIGN PATENT DOCUMENTS

WO    2013002488 A1    1/2013

* cited by examiner

*Primary Examiner* — Nabil Syed
(74) *Attorney, Agent, or Firm* — Slater Matsil, LLP

(57) ABSTRACT

A method for managing the operation of an object capable of contactless communication with a reader, magnetically coupled to the object, includes at least one phase for transmission of information from the object to the reader, including a modulation of the impedance of a load connected across the terminals of the antenna of the object. The method furthermore comprises a control phase that includes an estimation of the distance between the object and the reader and an adjustment of the impedance of the load as a function of the estimated distance.

21 Claims, 4 Drawing Sheets

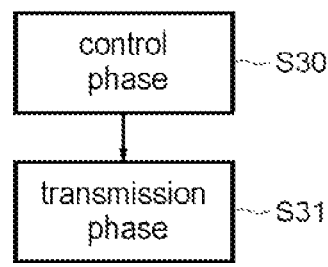
FIG.4
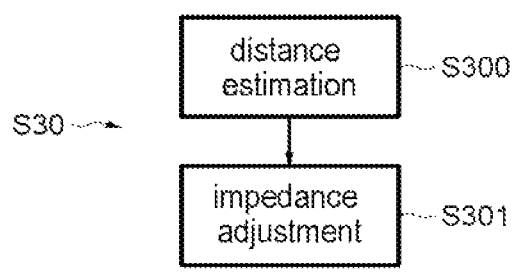
FIG.5
FIG.6
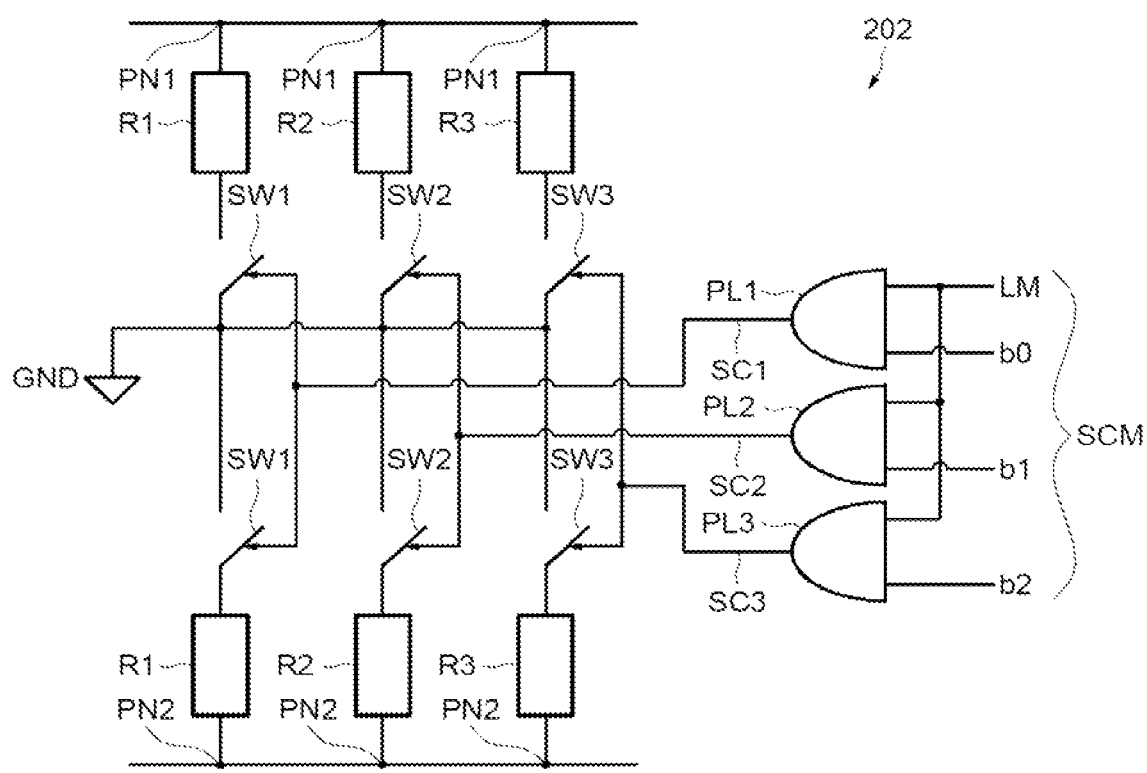

METHOD FOR OPERATING OBJECT CAPABLE VIA CONTACTLESS COMMUNICATION

This application claims priority to French Application No. 1460249, filed on Oct. 24, 2014, which application is hereby incorporated herein by reference.

TECHNICAL FIELD

Embodiments of the invention relate to a method for managing the operation, in particular the load modulation, of an object that is able to contactlessly communicate with a reader, and also to a corresponding device and object.

BACKGROUND

Near-field communication, known to those skilled in the art by the abbreviation NFC, is a wireless connectivity technology which enables communications over a short distance, for example 10 cm, between electronic devices, such as for example contactless smartcards or mobile telephones emulated in card mode, and readers.

NFC technology is particularly suited to connecting any type of user device and enables fast and easy communications.

A contactless object is an object capable of exchanging information via an antenna with another contactless object, for example, a reader, according to a contactless communications protocol.

An NFC object, which is a contactless object, is an object compatible with NFC technology.

NFC technology is an open technology platform standardized in the ISO/IEC 18092 and ISO/IEC 21481 standards, but incorporates many already-existing standards, such as for example the type A and type B protocols defined in the ISO-14443 standard which can be communications protocols usable in the NFC technology.

Aside from its conventional function of a telephone, a cellular mobile telephone may be used (if it is equipped with specific circuitry) for exchanging information with another contactless device, for example a contactless reader, using a contactless communications protocol usable in the NFC technology.

This allows information to be exchanged between the contactless reader and secure elements situated within the mobile telephone. Numerous applications are thus possible such as mobile ticketing in public transport (the mobile telephone behaves as a travel ticket) or else mobile payments (the mobile telephone behaves as a payment card).

During a transmission of information between a reader and an object emulated in tag or card mode, the reader generates a magnetic field using its antenna which is generally, in the standards conventionally used, a sine wave at 13.56 MHz. The intensity of the magnetic field is in the range between 0.5 and 7.5 amps/meter RMS (Root Mean Square).

On the other side, the antenna of the object emulating the tag modulates the field generated by the reader.

This modulation is carried out by modifying the load connected to the terminals of the antenna of the object.

By modifying the load across the terminals of the antenna of the object, the output impedance of the antenna of the reader changes owing to the magnetic coupling between the two antennas. This results in a change in the amplitudes and/or the phases of the voltages and currents present on the antennas of the reader and of the object. Accordingly, in this way, the information to be transmitted from the object to the reader is transmitted via load modulation to the antenna current of the reader.

The variation in load effected during the load modulation results in an amplitude and/or phase modulation of the signal (voltage or current) on the antenna of the reader. A copy of the antenna current is generated and injected into the receiver chain of the reader where it is demodulated and processed so as to extract the information transmitted.

The best transfer of power between the reader and the tag is obtained when the tag is equipped with a circuit matched with the resonant circuit of the reader, and itself resonant at the frequency of the signal transmitted by the reader, for example 13.56 MHz.

However, when the tag is too close to the reader, the resonance frequency of the resonant circuit of the reader will shift towards another value of frequency owing to the magnetic coupling between the two resonant circuits of the reader and of the tag. This results accordingly in a reduction of the efficiency and hence of the power transmitted by the reader which may, in certain cases, lead to a loss of the link between the reader and the tag.

Similarly, when the tag is very far from the reader, and even if the resonance frequency of the resonant circuit of the tag is equal to the emission frequency (13.56 MHz, for example), this will result in a modification of the resonance frequency of the resonant circuit of the reader, albeit to a lesser extent, owing to the reduction in the magnetic coupling between the reader and the tag.

SUMMARY

The present invention relates generally to a system and method, and, in particular embodiments, to a system and method for various embodiments of the invention and their implementation relate to wireless communications between a reader and an object, for example a transponder of the tag type, a contactless smartcard or else a mobile telephone emulated in card mode, where these examples are non-limiting, and more particularly to the management of the load modulation carried out within such an object, in particular an object of the NFC (Near-Field Communication) type.

According to one embodiment and its implementation, the idea is to limit as much as possible, or even to eliminate, the reduction in power transmitted by the reader resulting from certain relative positions between the reader and the tag.

According to one aspect, a method is provided for managing the operation of an object capable of contactless communication with a reader magnetically coupled to the object, comprising at least one phase for transmission of information from the object to the reader comprising a modulation of the impedance of a load connected across the terminals of the antenna of the object.

According to a general feature of this aspect, the method furthermore comprises a control phase comprising an estimation of the distance between the object and the reader and an adjustment of the impedance of the load as a function of the estimated distance.

Thus, the adjustment of the impedance of the load as a function of the estimated distance between the reader and the tag allows the aforementioned potential variations in power transmitted by the reader resulting from the magnetic coupling between the respective antennas of the reader and of the tag to be overcome.

The control phase may be carried out prior to the transmission phase or potentially created during this transmission phase in order to take into account any displacement of the object during the transmission phase.

Furthermore, when several phases are provided for transmission of information between the object and the reader, it is preferable to carry out a control phase prior to each transmission phase, in such a manner as to thus take into account any possible variation in distance between the object and the reader between two transmission phases.

The adjustment of the impedance of the load advantageously comprises a variation in the load impedance in the same direction as that of the variation in the distance. In other words, the more the distance between the reader and the object decreases, the more the impedance will decrease. On the contrary, the more the distance increases, the more the impedance will increase.

Several solutions are possible for estimating the distance between the object and the reader.

Thus, according to a first possibility, the estimation of the distance comprises an estimation of the energy received by the object and resulting from the magnetic field radiated by the reader and a comparison of the level of this energy with at least one threshold.

In this case, according to one embodiment in which the object comprises a processing circuit connected to the antenna via a rectifier element, the estimation of the energy comprises the determination of a voltage across the terminals of a capacitor acting as an energy storage and connected between the rectifier element and the processing circuit.

In general, the object also comprises a controllable voltage limiting circuit (better known by those skilled in the art under the terminology "clipping device", "clipping circuit" or "clipper") connected across the terminals of the antenna and designed to absorb any potential over-voltages.

In this case, according to another possibility, the estimation of the distance comprises a determination of the level of activity of the clipping device and a comparison of this level of activity with at least one threshold.

The communication may for example be a near-field communication of the NFC type.

According to another aspect, a device is provided for managing the operation of an object capable of contactless communication with a reader magnetically coupled to the object, comprising a modulator configured for applying a modulation to the impedance of a load connected across the terminals of the antenna during a phase for transmission of information from the object to the reader.

According to one general feature of this other aspect, the device furthermore comprises a controller comprising an estimation module configured for carrying out an estimation of the distance between the object and the reader and an adjustment module configured for carrying out an adjustment of the impedance of the load as a function of the estimated distance.

The modulator and the adjustment module advantageously comprise common elements.

According to one embodiment, the adjustment module is configured for making the load impedance vary in the same direction as that of the variation of the distance.

According to one embodiment, the adjustment module comprises a resistive and/or capacitive network, connected across the terminals of the antenna, selectively controllable by control information representative of the estimated distance.

According to one possible variant, the estimation module is configured for carrying out an estimation of the energy received by the object and resulting from the magnetic field radiated by the reader and a comparison of the level of this energy with at least one threshold.

In such a variant, and according to one embodiment in which the object comprises a processing circuit connected to the antenna via a rectifier element, the estimation module comprises a capacitor acting as an energy storage and connected between the rectifier element and the processing circuit, and a comparator that compares the voltage with the at least one threshold.

According to another possible variant, the estimation module comprises a controllable clipping circuit, connected across the terminals of the antenna, circuitry configured to determine the level of activity of the clipping circuit and a comparison stage configured for comparing this level of activity with at least one threshold.

The device such as defined hereinbefore may advantageously be fabricated in an integrated manner.

According to another aspect, an object is provided, for example a smartcard, a tag, a cellular mobile telephone able to be emulated in card mode, incorporating a device such as defined hereinbefore.

BRIEF DESCRIPTION OF THE DRAWINGS

For a more complete understanding of the present invention, and the advantages thereof, reference is now made to the following descriptions taken in conjunction with the accompanying drawings, in which: Other advantages and features of the invention will become apparent upon examining the detailed description of embodiments and their implementation, which are non-limiting, and the appended drawings in which:

FIGS. 1 to 10 illustrate schematically embodiments of the invention and their implementation.

DETAILED DESCRIPTION OF ILLUSTRATIVE EMBODIMENTS

Figure 1:
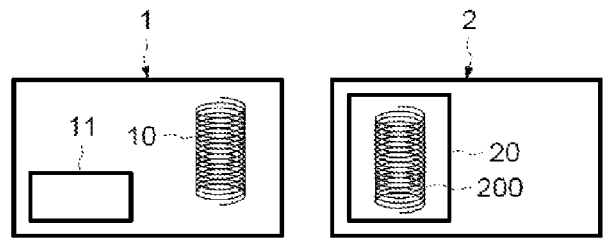

In FIG. 1, the reference 1 denotes a reader, for example but not limited to a cellular mobile telephone emulated in reader mode or else a conventional reader of a contactless smartcard or of a tag such as a badge, comprising an antenna 10 together with a vector demodulator 11 configured for carrying out an amplitude and/or phase demodulation of a signal able to be modulated in amplitude and/or in phase and received on the antenna 10, for example the voltage across the terminals of this antenna. The reader 1 is designed to radiate a magnetic field.

The reference 2 denotes an object, for example a cellular mobile telephone emulated in card mode, and more generally, an electromagnetic transponder such as a tag or a badge.

This object 2 here comprises an integrated circuit 20 here connected to an antenna 200 external to the integrated circuit and magnetically coupled to the antenna 10 of the reader 1.

Figure 2:
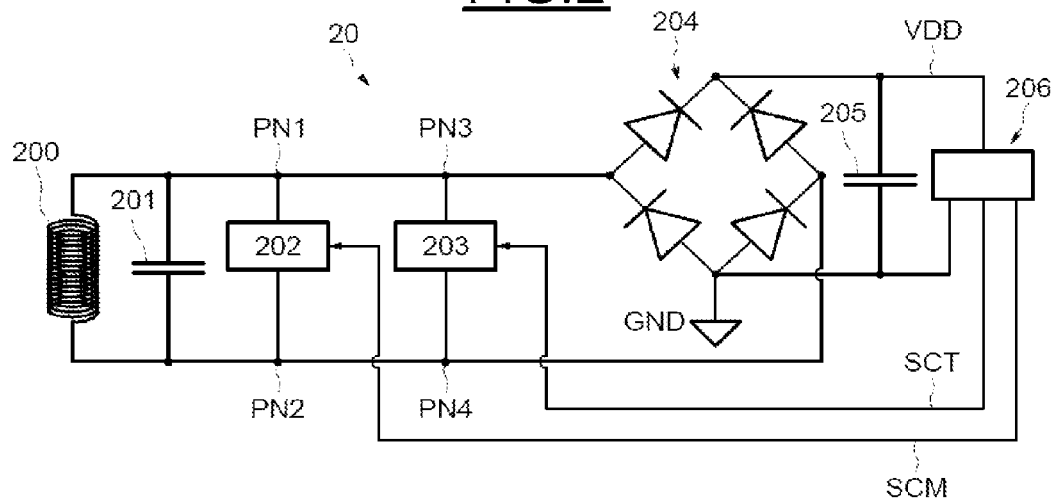

In FIG. 2, it can be seen that the integrated circuit here comprises a capacitor 201 forming with the coil 200 a parallel resonant circuit allowing, with a feedback-modulation stage 202, the magnetic field generated by an oscillating circuit of the reader to be modulated. This resonant circuit 200-201 is connected to the two alternative inputs of a diode rectifier bridge 204. As a variant, it would be possible for the rectifying element to be a single-alternation rectifying element.

When the object enters the magnetic field of the reader, a high-frequency voltage is generated across the terminals of the resonant circuit 200-201. This voltage, rectified by the rectifier bridge 204, supplies a power supply voltage VDD to an electronic circuit 206 of the object which can for example contain at least one memory and a processor.

Furthermore, a capacitor 205 used as an energy storage ("buffer capacitor") is also connected between the power supply voltage VDD and ground GND in parallel with the electronic circuit 206.

Generally, the integrated circuit also comprises a clipping circuit 203 whose two terminals PN3 and PN4 are connected to the two terminals of the resonant circuit 200-201. This clipping circuit is controllable by a control signal SCT emanating, in this embodiment, from the electronic circuit 206.

In order to allow the transmission of data from the object to the reader 1, the electronic circuit 206 sends a command, by way of a control signal SCM, to the feedback-modulation stage 202 of the resonant circuit 200-201. This stage 202 comprises, as will be seen in more detail hereinafter, a set of electronic switches controlled by the signal SCM and a resistive and/or capacitive circuit, selectively controllable by the switches, in such a manner as to modify the load connected across the terminals of the antenna 200 and to thus allow, on the one hand, the detection by the reader, and on the other hand, the adjustment of the impedance of this load as a function of the distance between the reader and the object.

Figure 3:
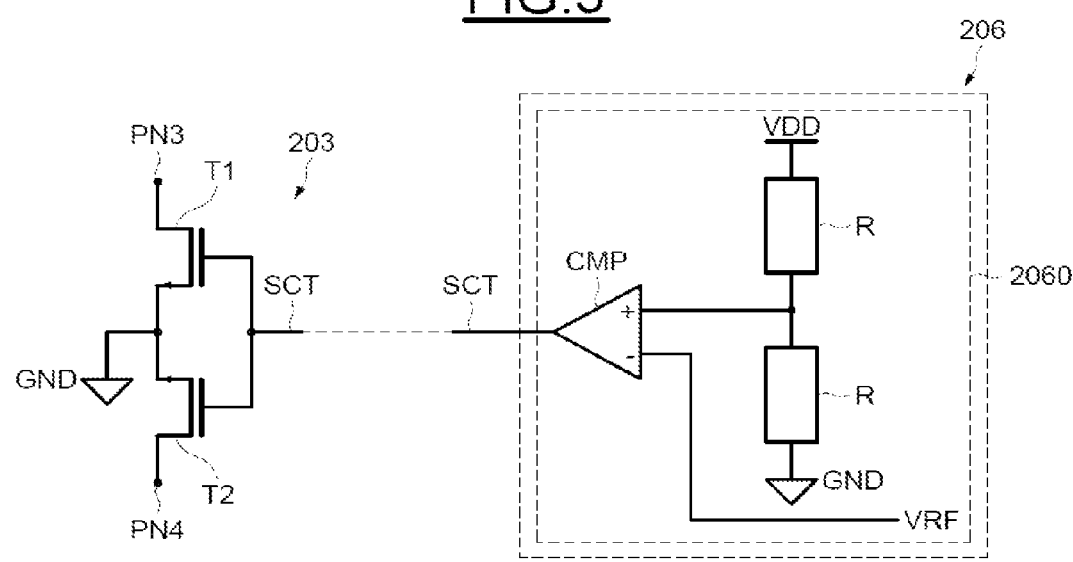

Reference is now more particularly made to FIG. 3 in order to describe one embodiment of a clipping device, this example being in no way limiting.

As indicated hereinabove, when the reader generates an electromagnetic field, for example at 13.56 MHz, this field will induce a voltage across the terminals of the inductance 200 of the antenna of the object. The value of this induced voltage depends on the coupling coefficient between the antennas of the reader and of the object, on the intensity of the current used by the reader for generating the electromagnetic field and on the value of the inductance L.

When the object is placed very close to the reader, the induced voltage may become so large that it can destroy notably the electronic circuit 206 if no precautions are taken.

It is for this reason that the integrated circuit is generally equipped with the clipping circuit 203. Functionally, as soon as the voltage induced across the terminals of the antenna of the object reaches a predefined value, the clipping circuit will switch into a mode where it will modify the impedance of the antenna in such a manner as to limit the induced voltage. In practice, the impedance of the clipping circuit will fall.

In FIG. 3, it can be seen that the clipping circuit 203 comprises a first NMOS transistor T1 connected between the terminal PN3 and ground GND and a second NMOS transistor T2 connected between the terminal PN4 and ground GND. The gates of these two transistors are controlled by the control signal SCT delivered by a control module 2060 for example incorporated into the electronic circuit 206.

This control module 2060 here comprises a potential divider formed from two resistors R connected in series between the voltage VDD and ground GND and whose mid-point is connected to the positive input of a comparator CMP, the negative input of this comparator CMP receiving a predefined reference voltage VRF, for example 1.2 Volts.

If the voltage VDD has a value of less than twice the value of the reference voltage VRF, the signal SCT will always have the logic level "0", the NMOS transistors T1 and T2 then being turned off.

On the other hand, if the voltage VDD exceeds twice the value of the reference voltage, the transistors T1 and T2 will be conducting, which will have the effect of making the impedance seen from the antenna fall and, consequently, of reducing the induced voltage.

Although a device of the "OFF-ON" type has been described here for the sake of simplification, the control loop may in reality be more of the "analogue" type in the sense that, if the voltage VDD has a value slightly higher than twice the value VRF, the impedance presented by the transistors T1 and T2 in parallel with the inductance 200 will have a relatively high value, whereas if the voltage VDD is significantly higher than twice VRF, the impedance of the transistors T1 and T2 will be much lower.

In conclusion, the voltage VDD across the terminals of the capacitor 205 forming an energy storage will have a value less than or equal to twice the value of the voltage VRF.

When the object is very close to the reader, the voltage VDD will be limited to 2VRF. When the distance between the reader and the object increases, this voltage VDD will remain at the value 2VRF until its value is sufficiently low for the transistors of the clipping circuit to be continuously turned off. Then, from there on, when the distance further increases, the voltage VDD will start to fall.

The value of the voltage VDD can therefore be used as an indicator of the distance between the reader and the object.

The device for managing the operation of the object comprises a controller, incorporated at least in part within the electronic circuit 206, configured for carrying out a control phase comprising an estimation of the distance between the object and the reader and an adjustment of the impedance of the load connected across the terminals of the antenna as a function of the estimated distance.

In FIG. 4, the control phase S30 is carried out prior to the transmission phase S31. However, the control phase could also be carried out during the transmission phase.

If there exist several successive transmission phases, a control phase S30 will for example be carried out prior to each transmission phase S31 so as to take into account any potential movement of the object with respect to the reader between each data transmission phase.

As illustrated schematically in FIG. 5, the control phase S30 comprises an estimation S300 of the distance between the reader and the object and an adjustment S301 of the impedance of the load connected to the antenna as a function of the estimated distance.

Reference is now more particularly made to FIG. 6 in order to describe one embodiment of the feedback-modulation stage 202.

In this example, the feedback-modulation stage is purely resistive. However, in other cases, it could be both resistive and capacitive or else purely capacitive.

In this exemplary embodiment, the feedback-modulation stage 202 comprises a resistive network R1, R2, R3 connected and selectively controllable by control information SCM which will be seen to be representative of the estimated distance. This selectively controllable resistive network thus forms part of an adjustment module configured for carrying out an adjustment of the impedance of the load connected across the terminals of the antenna 200 of the object, as a function of the estimated distance between the object and the reader.

More precisely, the resistive network comprises a first pair of resistors R1 connected in series between the terminals PN1 and PN2 by a pair of switches SW1, for example, transistors. The mid-point of this structure is connected to ground.

The resistive network also comprises a second pair of resistors R2 also connected in series between the terminals PN1 and PN2 by a pair of second switches SW2. Here again, the mid-point of this structure is connected to ground.

Lastly, the adjustment module comprises a third pair of resistors R3 connected in series between the terminals PN1 and PN2 by a third pair of switches SW3. Here again, the mid-point of this structure is connected to ground.

The adjustment module furthermore comprises here an assembly of three logic gates PL1, PL2, PL3, here AND gates whose respective outputs supply three control signals SC1, SC2, SC3 respectively controlling the switches SW1, SW2 and SW3.

The three logic gates PL1-PL3 are controlled by the control signal SCM which comprises an elementary logic signal LM delivered by the electronic circuit and designed to retro-modulate the impedance of the load as a function of the data to be transmitted. This elementary signal LM is delivered onto each of the first inputs of the logic gates PL1-PL3.

The control signal SCM furthermore comprises three other elementary signals b0, b1 and b2 respectively delivered onto the second inputs of the three logic gates PL1-PL3.

Each of the elementary signals LM, b0, b1 and b2 is able to take a logic level "0" or a logic level "1".

Depending on the logic value of the elementary signals b0, b1 and b2, one of the pairs of resistors will be selected.

In this exemplary embodiment, the value of the resistors R1 is lower than that of the resistors R2 itself lower than that of the resistors R3. By way of example, a value of 80 Ohms for the resistors R1, a value of 110 Ohms for the resistors R2 and a value of 140 Ohms for the resistors R3 may for example be taken.

As can now be seen in more detail, for a short distance between the reader and the object, it is the pair of resistors R1 that will be selected for carrying out the feedback-modulation whereas, for a greater distance, it will be the pair of resistors R2 that will be selected for carrying out the feedback-modulation, and for an even greater distance it is then the pair of resistors R3 that will be selected for carrying out the feedback-modulation.

Thus, for a given distance or range of distances, two of the switches, for example the switches SW2 and SW3 will be constantly open whereas the other switches SW1 will be open and closed depending on the logic value of the elementary signal LM.

Figure 7:
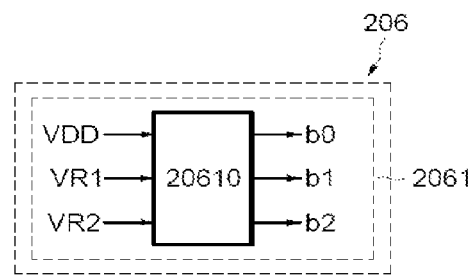

Reference is now more particularly made to FIG. 7 in order to describe a first embodiment of an estimation module 2061 configured for estimating the distance between the object and the reader.

In this embodiment, the estimation module 2061 is configured for performing an estimation of the energy received by the object and resulting from the magnetic field radiated by the reader and for comparing this energy with at least one threshold, in the present case two thresholds, and for this purpose, the estimation module 2061 will use the voltage VDD present across the terminals of the capacitor 205 forming an energy storage.

Two voltage thresholds VR1 and VR2, for example equal to 2.5 Volts and 3.5 Volts, are used here.

A comparison stage 20610 then compares the voltage VDD with these two thresholds VR1 and VR2 in order to deliver the elementary control signals b0, b1 and b2.

More particularly, if the voltage VDD is less than or equal to VR1, then the elementary signal b0 and the elementary signal b1 takes the logic value "0" whereas the elementary signal b2 takes the logic value "1".

If the voltage VDD is higher than VR1 and lower than or equal to VR2, then it is this time the logic signal b1 which takes the value 1 whereas the logic signals b0 and b2 have the logic value 0.

If the voltage VDD is higher than VR2, then it is this time the control elementary signal B0 which takes the logic value "1" whereas the elementary control signals b1 and b2 take the logic value "0".

Figure 8:
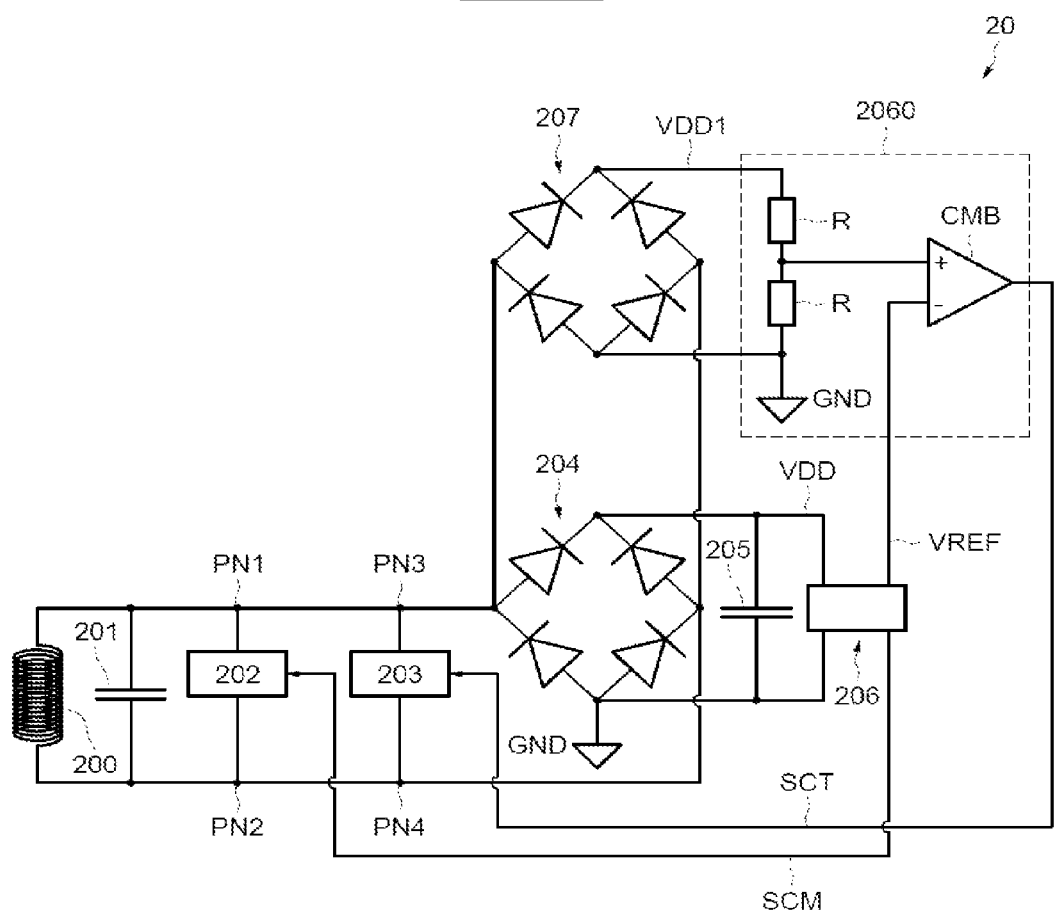
Figure 9:
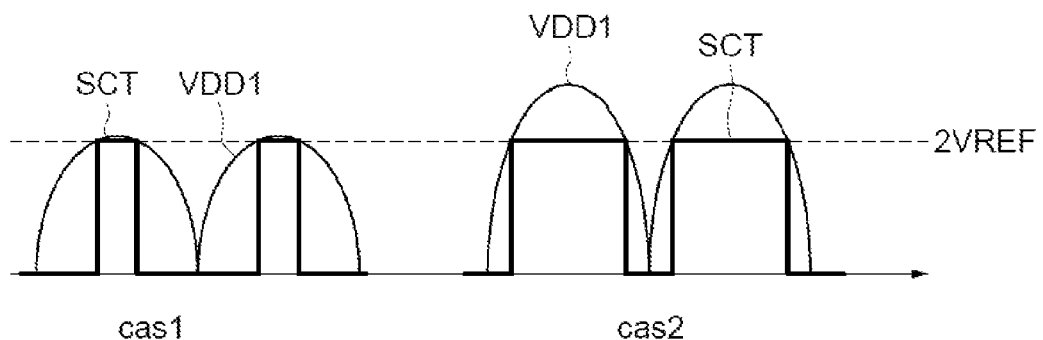

Reference is now more particularly made to FIGS. 8 and 9 in order to describe one variant for estimation of the distance between the reader and the object.

In this variant, the distance will be estimated based on the level of activity of the clipping circuit, and more particularly the duty cycle.

Here again, this level of activity, more precisely the duty cycle, will be compared with at least one threshold in order to determine the values of the elementary signals b0, b1 and b2 of the control signal SCM.

More precisely, in this case, as illustrated in FIG. 8, the integrated circuit 20 comprises, aside from the elements which have been described with reference to FIG. 2, an additional rectifier bridge 207 also connected across the terminals of the external antenna 200 and supplying a rectified but unfiltered voltage VDD1 to the control module 2060 analogous to that which has been described with reference to FIG. 3 and which delivers the control signal SCT for the clipping circuit 203.

This time, as can be seen in FIG. 8, the control module 2060 is situated outside of the electronic circuit 206, the latter however supplying the value VRF to the comparator CMP.

The duty cycle of the clipping circuit 203 is then defined, which is representative of the level of activity of this clipping circuit as being the ration between the time during which the transistors T1 and T2 are conducting and the time during which the transistors T1 and T2 are turned off.

In FIG. 9, two scenarios are illustrated.

In the case 1 (left-hand side of FIG. 9) the object is assumed to be at a greater distance from the object than in the case 2 (right-hand side of FIG. 9).

In each of these cases, it can be seen that, when the voltage VDD1 exceeds twice the voltage VRF, the control signal SCT takes the logic state "1" in order to render the transistors T1 and T2 conducting and takes the logic state "0" for the opposite case.

Moreover, the shorter the distance between the object and the reader, the higher will be the duty cycle F.

Two thresholds F1 and F2 may thus be defined for the values of these duty cycles and the comparison of the duty cycle with these two thresholds VF1, VF2 will allow the logic values of the elementary signals b0, b1 and b2 to be determined.

Figure 10:
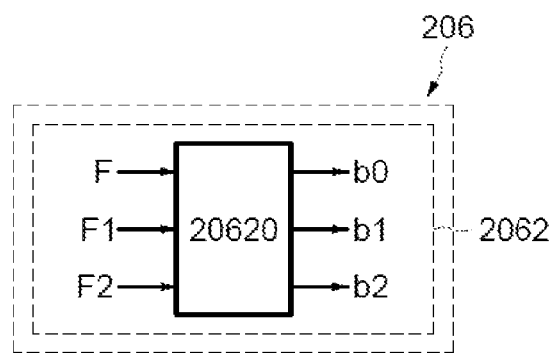

In practice, as illustrated in FIG. 10, this comparison is carried out in a comparison stage 20620 of the estimation module 2062.

What is claimed is:

1. A method for managing operation of an object capable of contactless communication with a reader magnetically coupled to the object, the method comprising:
performing a control phase that comprises estimating a distance between the object and the reader and adjusting an impedance across terminals of an antenna of the object by adjusting an impedance of a load connected across the terminals of the antenna, the impedance across the terminals of the antenna being adjusted as a function of the estimated distance; and performing a transmission phase of information from the object to the reader, the transmission phase comprising modulating the impedance of the load wherein adjusting the impedance of the load comprises varying the impedance of the load in the same direction as a variation of the distance.

2. The method according to claim 1, wherein estimating the distance comprises an estimating an energy level received by the object that results from a magnetic field radiated by the reader and an comparing the energy level with a threshold.

3. The method according to claim 2, wherein the object comprises a processing circuit coupled to the antenna via a rectifier element and wherein estimating the energy level comprises determining a voltage across terminals of a capacitor that acts as an energy storage and is connected between the rectifier element and the processing circuit and comparing the determined voltage with the threshold.

4. The method according to claim 2, wherein the energy level is compared with two thresholds.

5. The method according to claim 4, wherein the object comprises a processing circuit coupled to the antenna via a rectifier element and wherein estimating the energy level comprises determining a voltage across terminals of a capacitor that acts as an energy storage and is connected between the rectifier element and the processing circuit and comparing the determined voltage with the thresholds.

6. The method according to claim 1, wherein the object comprises a controllable clipping circuit coupled across the terminals of the antenna and wherein estimating the distance comprises determining a level of activity of the clipping circuit and comparing the determined level of activity with a threshold.

7. The method according to claim 6, wherein the determined level of activity is compared with two thresholds.

8. The method according to claim 1, wherein the communication is a near-field communication of the NFC type.

9. A device for managing operation of an object capable of contactless communication with a reader magnetically coupled to the object, the device comprising:
a modulation circuit coupled to a load, the load being directly connected across first and second terminals of an antenna, the modulation circuit configured to modulate an impedance of the load during a transmission phase when information is transmitted from the object to the reader, wherein modulating the impedance of the load modulates an impedance across the first and second terminals of the antenna;
an estimation circuit coupled to the antenna and configured to carry out an estimation of a distance between the object and the reader; and
an adjustment circuit configured to carry out an adjustment of the impedance of the load as a function of the estimated distance wherein the adjustment circuit is configured to vary the impedance of the load in the same direction as a variation of the distance between the object and the reader.

10. The device according to claim 9, wherein the adjustment circuit comprises elements in common with the modulator.

11. The device according to claim 9, wherein the adjustment circuit comprises a resistive and/or capacitive network coupled connected across the first and second terminals of the antenna, the resistive and/or capacitive network being selectively controllable by control information that is based on the estimated distance.

12. The device according to claim 9, wherein the estimation circuit is configured to estimate a level of energy that results from a magnetic field radiated by the reader and to compare the estimated level of energy with a threshold.

13. The device according to claim 12, wherein the object comprises a processing circuit connected to the antenna via a rectifier element, wherein the estimation circuit comprises a capacitor coupled between the rectifier element and the processing circuit, a comparator with a first input coupled across terminals of the capacitor and a second input coupled to a threshold node.

14. The device according to claim 9, wherein the estimation circuit comprises:
a controllable clipping circuit coupled across the first and second terminals of the antenna;
a processing circuit configured to determine an activity level of the clipping circuit; and
a comparator configured to compare the activity level with a threshold.

15. The device according to claim 9, wherein the device is fabricated in an integrated manner.

16. An object comprising:
an antenna;
a load connected across terminals of the antenna;
a modulator coupled to the load;
a rectifier element;
a processing circuit coupled to the antenna via the rectifier element;
a capacitor coupled between the rectifier element and the processing circuit
a comparator with a first input coupled across terminals of the capacitor and a second input coupled to a threshold node;
a controllable clipping circuit coupled across the terminals of the antenna;
estimation circuitry coupled to the controllable clipping circuit to determine an activity level of the clipping circuit and to compare the activity level with a threshold so as to estimate a distance between the object and a reader communicating with the object; and
a resistive and/or capacitive network coupled across the terminals of the antenna, the resistive and/or capacitive network being selectively controllable by control information that is based on the estimated distance between the object and the reader, wherein the resistive and/or capacitive network is selectively controllable by the control information to vary an impedance of the load in the same direction as a variation of the distance.

17. The object according to claim 16, wherein the clipping circuit and the estimation circuitry are configured to estimate a level of energy that results from a magnetic field radiated by the reader.

18. The object according to claim 16, wherein elements of the network form part of the modulator.

19. The object according to claim 16, wherein the object comprises an NFC object.

20. The object according to claim 18, further comprising a second rectifier element coupled across terminals of the antenna, the second rectifier element configured to supply a voltage to the modulator.

21. The object according to claim 18, wherein the resistive and/or capacitive network is directly connected across the terminals of the antenna.

* * * * *